(12) United States Patent
Wilson

(10) Patent No.: US 7,245,652 B2
(45) Date of Patent: Jul. 17, 2007

(54) RAKE COMBINER FOR A CDMA RAKE RECEIVER

(75) Inventor: Alice Wilson, Wokingham (GB)

(73) Assignee: Nokia Mobile Phones Limited, Espoo (FI)

( * ) Notice: Subject to any disclaimer, the term of this patent is extended or adjusted under 35 U.S.C. 154(b) by 580 days.

(21) Appl. No.: 09/734,885

(22) Filed: Dec. 13, 2000

(65) Prior Publication Data

US 2001/0004379 A1   Jun. 21, 2001

(30) Foreign Application Priority Data

Dec. 14, 1999   (GB) ................................. 9929572.7

(51) Int. Cl.
   *H04B 1/00*   (2006.01)
(52) U.S. Cl. ....................... 375/147; 375/148
(58) Field of Classification Search ........ 375/130–153, 375/242, 347, 316, 343; 370/320, 335, 345, 370/441, 342
   See application file for complete search history.

(56) References Cited

U.S. PATENT DOCUMENTS

| | | | |
|---|---|---|---|
| 5,910,950 A | * | 6/1999 | ten Brink .................... 370/342 |
| 5,931,893 A | | 8/1999 | Dent et al. |
| 5,953,366 A | * | 9/1999 | Naruse et al. ............... 375/148 |
| 6,038,271 A | * | 3/2000 | Olaker et al. ................ 375/343 |
| 6,081,547 A | * | 6/2000 | Miya ........................... 375/130 |
| 6,122,311 A | * | 9/2000 | Watanabe et al. ........... 375/147 |
| 2001/0036195 A1 | * | 11/2001 | Garyantes et al. .......... 370/441 |

FOREIGN PATENT DOCUMENTS

| | | |
|---|---|---|
| EP | 0 851 600 A2 | 7/1998 |
| EP | 0851600 A2 | 7/1998 |
| EP | 0881780 A2 | 12/1998 |
| GB | 2 295 527 | 5/1996 |
| GB | 2295527 A | 5/1996 |

* cited by examiner

*Primary Examiner*—Chieh M. Fan
*Assistant Examiner*—Jason M. Perilla
(74) *Attorney, Agent, or Firm*—Alston & Bird LLP

(57) ABSTRACT

A rake combiner for a CDMA rake receiver, the combiner comprising a receiver for receiving a plurality of multipath components of a signal; a memory; a controller arranged to store a first multipath component in the memory; a summer for summing the first multipath component with a second multipath component to provide a combined signal; wherein the controller is arranged to store the combined signal in the memory.

19 Claims, 2 Drawing Sheets

RAKE COMBINER FOR A CDMA RAKE RECEIVER

BACKGROUND OF THE INVENTION

1. Field of the Invention

This invention relates to a rake combiner, in particular a rake combiner for a CDMA rake receiver.

2. Description of the Prior Art

Multiple access communication systems allow a large number of users to establish wireless communication channels over a relatively limited frequency spectrum. One multiple access communication system that has become increasingly prominent is the spread spectrum multiple access telecommunication system, otherwise known as code division multiple access (CDMA).

Multiple access in a CDMA system is achieved by assigning each user in the system a pseudo-random code, where the assigned pseudo random codes have good auto and cross-correlation properties. In use the assigned pseudo-random code is modulated with a user's bit rate signal. The bandwidth of the modulated signal incorporating the pseudo-random code is much larger than the bandwidth of the user's bit rate signal, thereby spreading the user's relatively narrowband signal into a wide-band spread spectrum signal.

On receipt of the signal by a designated receiver the wideband signal is converted back into a narrow band signal using the original pseudo-random code to 'de-spread' the signal.

By ensuring the pseudo-random codes have good auto and cross correlation properties 'spread' signals from other users remain as wideband signals, thereby minimizing interference with the required 'narrow' band signal.

An advantage of a CDMA system is its ability to allow separate multipath signals to be combined using a rake receiver. Multipath signals arise from reflections of a signal from obstacles in the environment. The multipath signals are copies of the same transmitted signal but typically have different amplitudes, phases and delays. The time delay difference between the first and the last received multipath component is typically known as the maximum delay spread of the multipath signals.

A rake receiver has a plurality of rake fingers where each finger is allocated to receive a designated multipath component. To equalize the delays between the different multipath components etch finger has a delay equalization memory. The memory in each finger is used to store respective multipath components (i.e. the first multipath component received by a rake finger is stored in the received rake finger's memory until the last multipath component is received by a different rake finger). The delayed equalized multipath components are then combined via a rake combiner and written to memory before being decoded.

However, the use of memory in each rake finger to perform delay equalization can result in an increase in cost and complexity of the rake receiver. Further, the use of memory in each rake ringer to perform delay equalization limits the combination of multipaths to those that are shorter than the maximum delay of the rake finger memory.

It is desirable to improve this situation.

SUMMARY OF THE INVENTION

In accordance with a first aspect of the present invention there is provided a rake combiner for a CDMA rake receiver, the combiner comprising receiving means for receiving a plurality of multipath components of a signal; a memory; a controller arranged to store a first multipath component in the memory; summing means for summing the first multipath component with a second multipath component to provide a combined signal; wherein the controller is arranged to store the combined signal in the memory.

By storing a received multipath component in the combiner memory until a subsequently received multipath component is received by the combiner, the combiner is able to combine the stored multipath component with the subsequently received multipath component. This has the advantage of avoiding the need for extra memory in the rake fingers. This minimizes cost and complexity of the rake receiver.

Preferably the memory is a circular buffer.

Preferably the buffer is sized to support the maximum delay spread between the different multipath components.

Preferably the rake combiner further comprises phase rotation means for compensating for phase rotation between the multipath components.

This allows the phase rotation of received multipath components to be performed centrally, thereby further minimizing the cost and complexity of the rake receiver.

Preferably the controller is arranged to read from the memory the first multipath component for summing with the second multipath component.

Preferably the controller is arranged to store the combined signal in memory at the same memory address as the stored first multipath component.

In accordance with a second aspect of the present invention there is provided a method for combining a plurality of multipath components of a signal, the method comprising receiving a plurality of multipath components of a signal; storing a first multipath component in a memory; summing the first multipath component with a subsequently received second multipath component to provide a combined signal; storing the combined signal in the memory.

For a better understanding of the present invention and to understand how the same may be brought into effect reference will now be made, by way of example only, to the accompanying drawings, in which:

DETAILED DESCRIPTION OF THE INVENTION

Figure 1:
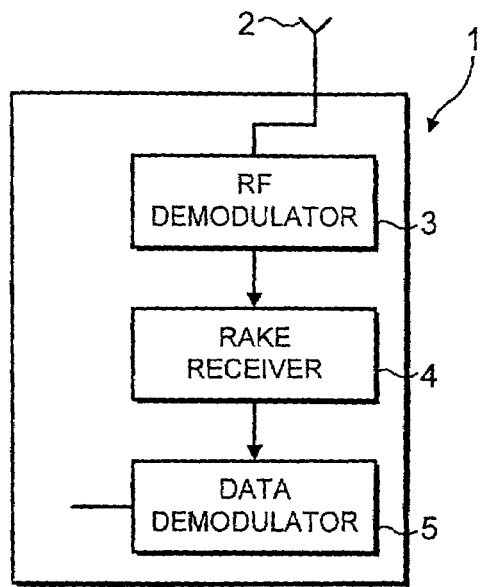
FIG. 1 is a schematic block diagram of a CDMA radiotelephone incorporating a rake combiner according to an embodiment of the present invention.

FIG. 1 shows a radiotelephone 1 suitable for use in a CDMA communication system. The radiotelephone 1 has an antenna 2 for receiving a spread spectrum RF signal. Typically the received spread spectrum signal will be transmitted as a quadrature, digitally modulated signal with a symbol period determined by the digital modulation scheme. The data structure of the signal (e.g. the logical/physical channel arrangement and the slot/frame sizes) defined in the appropriate CDMA standard (e.g. $3^{rd}$ Generation Partnership Project specification TS 25.211).

The antenna 2 is connected to an input of a demodulator module 3. A spread spectrum RF signal received by the antenna 2 is provided to the demodulator module 3. The demodulator module 3 down converts the spread spectrum RF signal to a spread spectrum baseband signal, converts the baseband analog signal into a digital signal and separates the in-phase (I) and quadrature-phase (Q) components.

An output of the demodulator module 3 is connected to an input of a rake receiver 4 with the demodulator module 3 providing the I and Q baseband data to the rake receiver 4. The rake receiver 4 despreads the spread spectrum signal and combines the multipath components of the transmitted signal, as described below.

An output of the rake receiver 4 is connected to an input of a data demodulator 5. The data demodulator 5 demodulates the received data symbols into data bits.

The data bits are then processed by the radiotelephone to obtain a representation of the information as originally input by the sending user, as is well known by a person skilled in the art.

Figure 2:
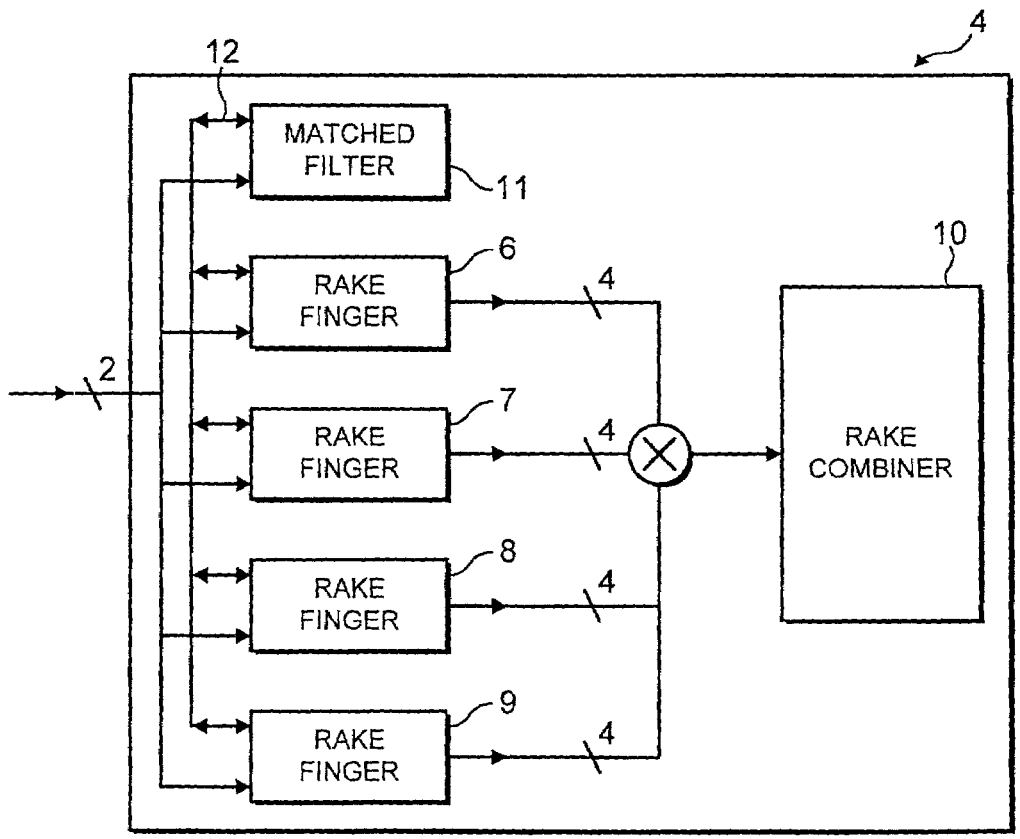
FIG. 2 is a schematic block diagram of a rake receiver according to an embodiment of the present invention.

FIG. 2 shows the rake receiver 4. The rake receiver 4 has four rake fingers 6, 7, 8, 9. Each rake finger 6, 7, 8, 9 has an I channel data input for receiving spread spectrum in-phase data symbols and a Q channel data input for receiving spread spectrum quadrature phase data symbols. The rake fingers 6, 7, 8, 9 process the received signal on a chip by chip basis and output associated symbols on a symbol by symbol basis. Each rake finger 6, 7, 8, 9 is assigned a multipath component of a symbol where each multipath component of the symbol is a replica of the originally transmitted symbol. Each multipath component is a fraction of the transmitted signal energy where typically each component has a different time delay, amplitude and phase shift from the other multipath symbol components. As each received multipath component is only a fraction of the transmitted signal energy the number of rake fingers in a rake receiver determines the received signal power of a spread spectrum signal. Typically, the number of rake fingers in a receiver will vary depending upon the given bandwidth of a given spread spectrum system.

The output of each rake finger 6, 7, 8, 9 is connected to an input of a rake combiner 10.

The rake receiver 4 has a matched filter 11. The matched filter 11 has an input for receiving a copy of the received signal. For a given symbol the matched filter 11 estimates the multipath delays between the different multipath components. The matched filter assigns to each rake finger, via a control line 12, a specific multipath symbol component, as is well known to a person skilled in the art. As also would be appreciated by a person skilled in the art the function of the matched filter can be performed by means other than a matched filter and can alternatively be housed separate to the rake receiver.

Figure 3:
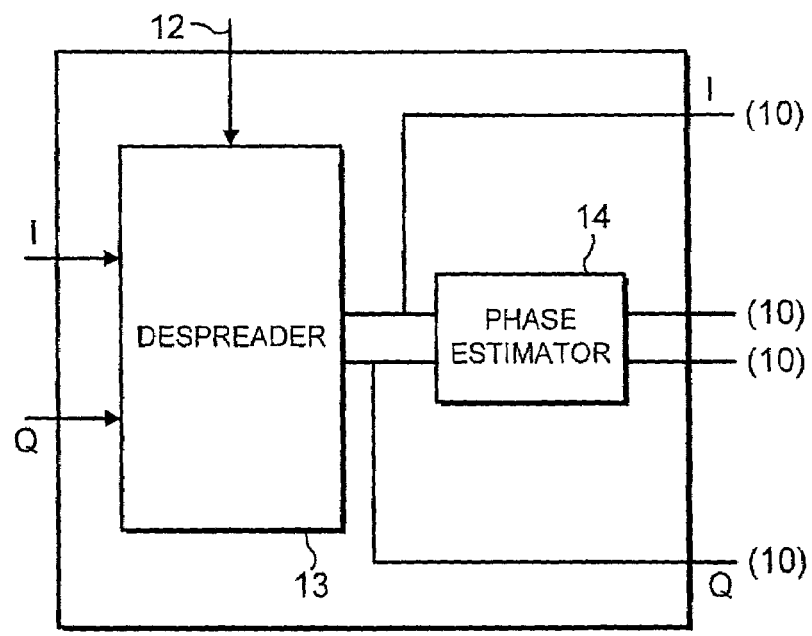
FIG. 3 is a schematic block diagram of a rake finger incorporated in a rake receiver according to an embodiment of the present invention.

Each rake finger 6, 7, 8, 9 is functionally identical, with FIG. 3 showing a schematic representation of one of the rake fingers. The rake finger 6, 7, 8, 9 has a despread module 13 having an input for receiving the wideband I data chips and an input for receiving the wideband Q data chips. The despread module 13 has an I and Q data symbol output which are both connected to an I and Q input of a phase estimator 14 and to an I and Q input of the rake combiner 10. The output of the phase estimator 14 is connected to the rake combiner 10.

On receipt of a multipath wide band I and Q data symbol component, the despread module 13 transforms the received wide band signal into a narrow band signal by correlating the received signal with the appropriate pseudo-random code, as described above.

The narrow band despread symbol is then provided to the input of the phase estimator 14 and to the input of the rake combiner 10.

The phase estimator 14 estimates the phase rotation of the received data symbol, as is well known to a person skilled in the art, and provides the estimated phase rotation to the rake combiner 10.

Each rake finger 6, 7, 8, 9 provides to the rake combiner 10 its assigned multipath component without compensating for any multipath delay. Accordingly, the multipath components of a transmitted symbol will arrive at the rake combiner 10 separately in time.

Figure 4:
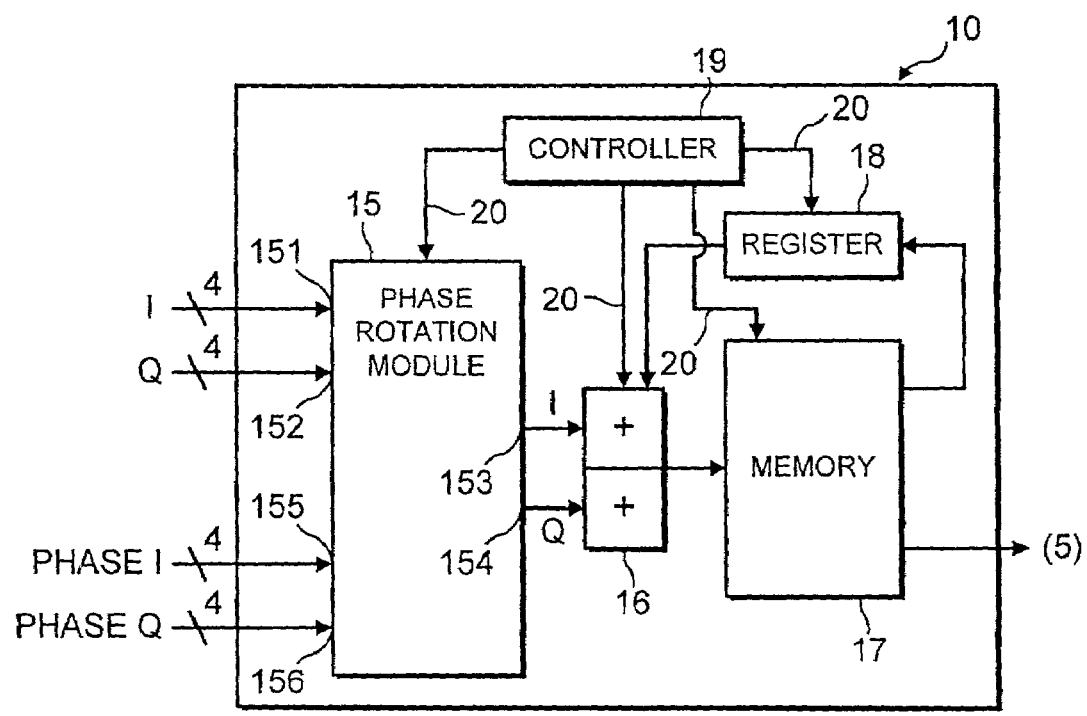
FIG. 4 is a schematic block diagram of a rake combiner according to an embodiment of the present invention.

The rake combiner 10 shown in FIG. 4 has a phase rotation module 15 having I and Q data inputs 151, 152 and I and Q data outputs 153, 154 connected to respective I and Q data inputs of summing means 16, otherwise known as an adder. The adder 16 comprises two separate adders, one for the I data, the second for the Q data. The phase rotation module 15 also has inputs 155, 156 connected to the phase estimator output to allow receipt of the phase rotation estimation information. The adder 16 has an output connected to an input of a memory 17. The memory 17, typically a circular buffer, is arranged to store received symbol information. The memory 17 has a plurality of memory addresses where each memory address is arranged to store received symbol information for a specific symbol while the specified symbol multipath components are being combined, as described below. Each memory address is split into two parts, one part stores the respective in-phase symbol information, the other part stores the respective quadrature phase symbol information.

The memory 17 has an output coupled to an input of a register 18. The register 18 is arranged to store the contents of a memory address. An output of the register 18 is connected to a second input of the adder 16. The memory 17 has a second output which is connected to an input of the data modulator 5. The sequencing of the phase rotation module 15, the adder 16, the memory 17 and the register 18 are controlled by controller 19 via control lines 20.

The rake finger I and Q data outputs are connected to the phase rotation module I and Q data inputs 151, 152, thereby allowing the received and Q data symbols to be input into the phase rotation module. As a data symbol is being input into the phase rotation module 15, in parallel, the associated phase rotation estimation information is provided to the phase rotation module, via inputs 155, 156.

The phase rotation module 15 adjusts the phase of the received data symbol to compensate for phase rotation of the received symbol compared with the transmitted symbol, as is well known to a person skilled in the art. The phase rotation can be different for each multipath component.

The first multipath symbol component after being phase rotated is read into the circular buffer 17 at an address determined by the controller 19.

On receipt by the phase rotation module 15 of the second multipath symbol component, from a different rake finger, the phase rotation module 15 compensates for the phase rotation effects of the second multipath and passes the multipath component to adder 16. The first multipath symbol component is read out of the circular buffer 17 and stored in register 18. The register 18 provides the first multipath symbol component to adder 16, which combines the first and second multipath symbol components. The combined multipath component is then read from the adder 16 to the circular buffer 17 and stored in the same address as previously used for storing the first multipath symbol component, thereby overwriting the first multipath component value. Subsequently received multipath symbol components are combined with the associated multipath symbol components stored in memory 17 in the same manner as described above.

Once a rake finger 6, 7, 8, 9 has written its allocated multipath component to the rake combiner 10, the rake finger 6, 7, 8, 9 is re-allocated to a multipath component of a different symbol. This allows multiple symbols to be combined in the circular buffer in parallel.

An example of the combining of multipath components in accordance with the above embodiment of the present invention will now be described.

On receipt by the rake receiver 4 of a spread spectrum signal the matched filter 11 correlates the received signal with different phases of the assigned pseudo-random code to find the multipath components of respective symbols. On identifying the four strongest multipath signal components each multipath component is assigned to a rake finger. For example, of the four strongest components of symbol 'one' the first received component is assigned to rake finger 6, the second received component is assigned to rake finger 7, the third received component is assigned to rake finger 8 and the fourth received component is assigned to rake finger 9.

On receipt by rake finger 6 of the first multipath component of symbol 'one', rake finger 6 estimates the phase of the received component and passes the estimated phase shift and symbol component to the rake combiner 10. Once the first multipath component has been written to the rake combiner 10 rake finger 6 can be reassigned to, for example, the first multipath component of symbol 'two'.

On receipt by the rake combiner 10 of the first multipath component of symbol 'one', the phase of the symbol is rotated in accordance with the phase rotation estimated information and the phase rotated multipath component is written to address 'one' in the circular buffer 17.

If the next received symbol component is the second multipath component of symbol 'one', rake finger 7 estimates the phase of the received component and passes the estimated phase shift and symbol component to the rake combiner 10. The second multipath component is combined with the first multipath component, via adder 16, and written to address 'one' of the circular buffer 17.

If, however, the next received symbol component is the first multipath component of symbol 'two' (i.e. the time difference between multipath one and multipath four is larger than the time difference between the transmission of symbol 'one' and symbol 'two') rake finger 6 will write this information, together with phase information, to the rake combiner 10. On receipt by the rake combiner 10 of the first multipath component of symbol 'two', the phase of the symbol is rotated in accordance with the phase estimated information and the phase rotated multipath component is written to address 'two' in the circular buffer 17.

If the next received symbol component is the third multipath component of symbol 'one', rake finger 8 estimates the phase of the received component and passes the estimated phase shift and symbol component to the rake combiner 10. The third multipath component is combined with the first and second multipath component, via summer 16, and written to address one of the circular buffer 17.

Once all four multipath symbol components have been combined and stored in the circular buffer 17, the stored symbol information is read out and provided to data demodulator 5 which transforms the symbols into a bit stream.

In view of the foregoing description it will be evident to a person skilled in the art that various modifications may be made within the scope of the invention. For example, it will be appreciated that more or less than four rake fingers can be used, the rake combiner can be configured to operate in different CDMA systems.

What is claimed is:

1. A rake combiner for a CDMA rake receiver, the combiner comprising receiving means for receiving multipath components of a plurality of symbols with each multipath component having a first part and a second part, a memory comprising a memory-location for each of the plurality of symbols, each memory location comprising a first memory area and a second memory area, a controller arranged for storing the plurality of symbols in the memory, and a summer for summing, separately for each symbol, the first parts of the multipath components of each symbol into a first sum and the second parts of the multipath components of each symbol into a second sum, and the controller arranged to store the first and second sums for each of the plurality of symbols in the respective first and second memory areas for the respective symbols.

2. A rake combiner according to claim 1, wherein the memory is a circular buffer.

3. A rake combiner according to claim 2, wherein the circular buffer is sized to support a maximum delay spread between the multipath components.

4. A rake combiner according to claim 1, further comprising phase rotation means for compensating for phase rotation between the multipath components.

5. A rake combiner according to claim 1, wherein the controller is arranged to read from the memory the first sum and the second sum of earlier received multipath components of each of the plurality of symbols for summing with later received first and second parts of respective multipath components of each of the plurality of symbols.

6. A rake combiner according to claim 1, wherein the controller is arranged to store the first sum and the second sum of each of the plurality of symbols in the memory so that the summer sums a sum of the first parts of earlier received multipath components of each symbol with respective first parts of later received multipath components of each symbol and sums a sum of the second parts of earlier received multipath components of each symbol with respective second parts of later received multipath components of each symbol to provide combined first and second parts of the multipath components of each respective symbol, the combined first and second parts being stored in the respective first and second memory areas.

7. A CDMA rake receiver having a rake combiner according to claim 1, the rake receiver further comprising a plurality of rake fingers wherein each rake finger provides a multipath component to the rake combiner.

8. A CDMA rake receiver according to claim 7, wherein each rake finger is arranged to despread a respective CDMA multipath component.

9. A CDMA radiotelephone having a CDMA rake receiver according to claim 7.

10. A rake combiner for a CDMA rake receiver adapted to receive a plurality of multipath components of a plurality of symbols including a first symbol and a second symbol, wherein each of the first and second symbols includes a plurality of multipath components with each multipath component having a first part and a second part, the combiner comprising:

a memory including a first memory location and a second memory location, each of the first and second memory locations comprising a first memory area and a second memory area;

a controller for storing the first part of a multipath component of the first symbol in the first memory area of the first memory location and the second part of the respective multipath component of the first symbol in the second memory area of the first memory location, and for storing the first part of a multipath component of the second symbol in the first memory area of the second memory location and the second part of the multipath component of the second symbol in the second memory area of the second memory location; and a summer for summing a plurality of the multipath components of the first symbol to provide a first combined signal, and for summing a plurality of the multipath components of the second symbol to provide a second combined signal, the first combined signal comprising a sum of the first parts of the multipath components of the first symbol and a sum of the second parts of the multipath components of the first symbol, and the second combined signal comprising a sum of the first parts of the multipath components of the second symbol and a sum of the second parts of the multipath components of the second symbol;

wherein the controller is arranged to store the first and second combined signals in the respective first and second memory locations, the sums of the first and second parts of the first combined signal being stored in the respective first and second parts of the first memory location, and the sums of the first and second parts of the second combined signal being stored in the respective first and second parts of the second memory location.

11. A rake combiner according to claim 10, wherein the first symbol is transmitted to the rake receiver before the second symbol;

wherein the rake receiver is adapted to receive at least one multipath component of the second symbol before receiving at least one multipath component of the first symbol; and wherein the controller is arranged to store the multipath components of the first and second symbols, and store the first and second combined signals, in an order in which the respective components and combined signals are received and summed, respectively.

12. A rake combiner according to claim 10, wherein the memory is a circular buffer.

13. A rake combiner according to claim 12, wherein the circular buffer is sized to support the maximum delay spread between the multipath components.

14. A rake combiner according to claim 10, further comprising phase rotation means for compensating for phase rotation between the multipath components.

15. A rake combiner according to claim 10, wherein the controller is arranged to read from the memory the first sum of the first part and the second sum of earlier received multipath components of the first and second symbols for summing thereof with later received first and second parts of respective multipath components of the first and second symbols.

16. A rake combiner according to claim 10, wherein the controller is arranged to store the combined signals in the memory at the first and second memory locations so that the summer sums a sum of earlier received multipath components of the first and second symbols with respective later received multipath components of the first and second symbols to provide the first and second combined signals.

17. A CDMA rake receiver having a rake combiner according to claim 10, the rake receiver further comprising a plurality of rake fingers wherein each rake finger provides a multipath component to the rake combiner.

18. A CDMA rake receiver according to claim 17, wherein each rake finger is arranged to despread a respective CDMA multipath component.

19. A CDMA radiotelephone having a CDMA rake receiver according to claim 17.

* * * * *

UNITED STATES PATENT AND TRADEMARK OFFICE
CERTIFICATE OF CORRECTION

| | | |
|---|---|---|
| PATENT NO. | : 7,245,652 B2 | Page 1 of 1 |
| APPLICATION NO. | : 09/734885 | |
| DATED | : July 17, 2007 | |
| INVENTOR(S) | : Wilson | |

It is certified that error appears in the above-identified patent and that said Letters Patent is hereby corrected as shown below:

Column 8,

Line 18, claim 15 cancel "of the first part".

Signed and Sealed this

Sixteenth Day of March, 2010

David J. Kappos
*Director of the United States Patent and Trademark Office*